Feb. 22, 1955
J. Q. HOBACK
2,702,480
LIQUID SAMPLING APPARATUS
Filed April 18, 1952
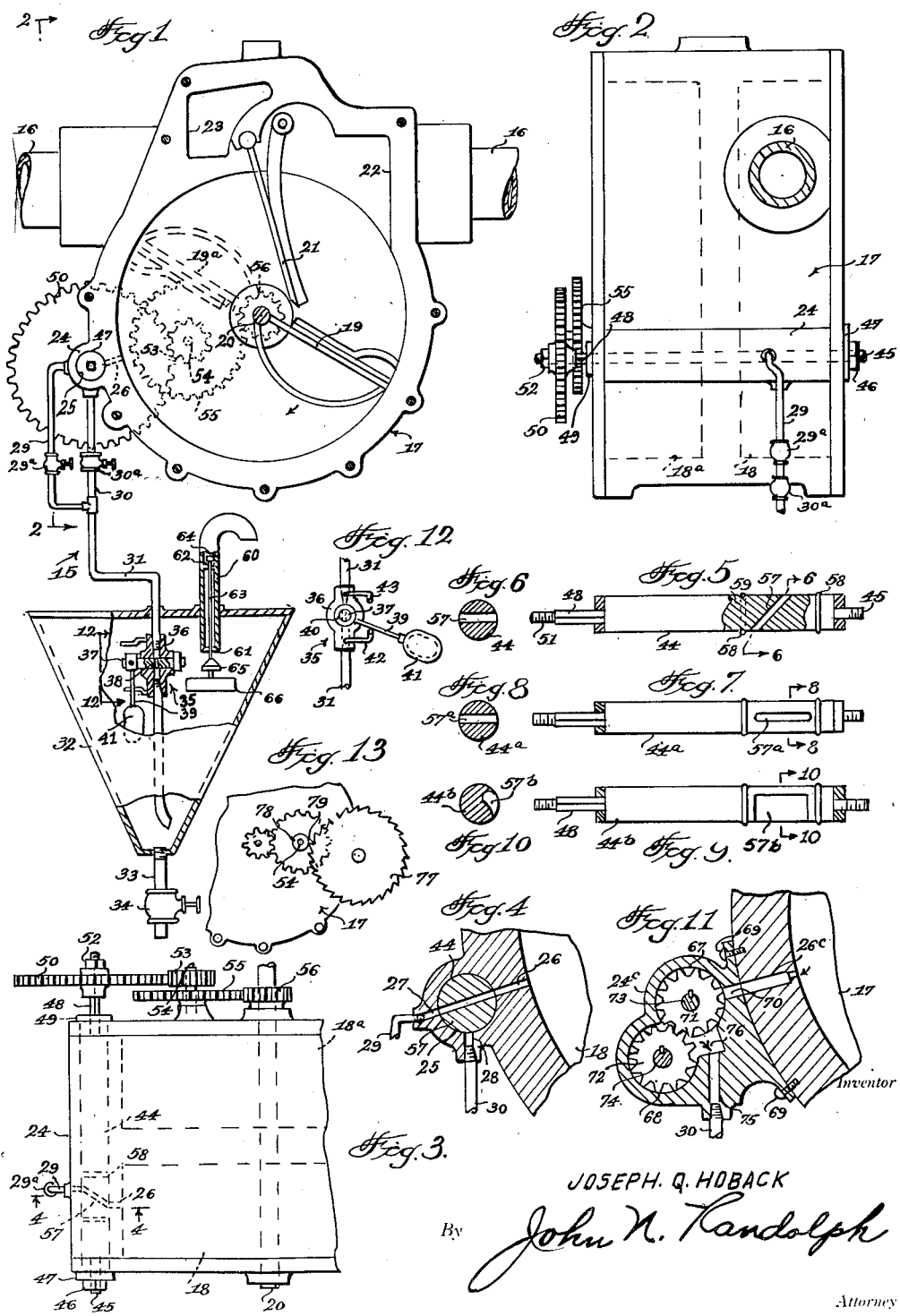
Inventor
JOSEPH Q. HOBACK
By John N. Randolph
Attorney United States Patent Office 2,702,480
Patented Feb. 22, 1955

2,702,480

LIQUID SAMPLING APPARATUS

Joseph Q. Hoback, Santa Maria, Calif.

Application April 18, 1952, Serial No. 282,971

1 Claim. (Cl. 73—422)

This invention relates to an apparatus for use in extracting a sample of a liquid from a flow line for the purpose of testing the condition of the liquid and which is so constructed that the test sample may be obtained over a period of twenty-four hours, for example, in a uniform amount throughout the period so that an accurate sample of the average condition or character of the liquid passing through the flow line may be obtained, and which is particularly important where certain characteristics of the liquid may vary from time to time.

Another object of the invention is to provide a sampler of relatively simple construction which may be readily adjusted for varying the quantity of the sample taken within any given period of time to compensate for variations in the character of the liquid being sampled, as for example, the specific gravity thereof and to further compensate for variations in the pressure in the flow line and the rate of flow therethrough.

Still a further object of the invention is to provide a sampling device capable of being readily connected to and driven by various devices associated with the flow line and to which motion is imparted by the liquid passing through the flow line.

Still a further object of the invention is to provide a sampler having novel means for automatically shutting off the sampler when a sample of a given quantity has been obtained.

Various other objects and advantages of the invention will hereinafter become more fully apparent from the following description of the drawing, illustrating a presently preferred embodiment thereof, and wherein:

Figure 1 is a side elevational view, partly in vertical section, showing one form of the sampler connected to a flow line and arranged to be driven by a flow meter interposed in the flow line;

Figure 2 is a view partly in section and partly in end elevation taken substantially along a plane as indicated by the line 2—2 of Figure 1;

Figure 3 is a fragmentary plan view of a portion of the sampling device;

Figure 4 is a sectional view thereof taken substantially along a plane as indicated by the line 4—4 of Figure 3;

Figure 5 is a side elevational view, partly in longitudinal section, of a core element of the sampler;

Figure 6 is a sectional view thereof taken substantially along a plane as indicated by the line 6—6 of Figure 5;

Figure 7 is a side elevational view of another form of core element;

Figure 8 is a cross sectional view thereof taken substantially along a plane as indicated by the line 8—8 of Figure 7;

Figure 9 is a view similar to Figure 7 of another form of the core element;

Figure 10 is a cross sectional view thereof taken substantially along a plane as indicated by the line 10—10 of Figure 9;

Figure 11 is a view similar to Figure 4 showing a gear type pump unit for use in lieu of the core elements of Figures 1 to 10.

Figure 12 is a fragmentary side elevational view of the control means for shutting off the flow to the sampler storage tank, taken substantially along a plane as indicated by the line 12—12 of Figure 1, and Figure 13 is a view of a modified form of gear drive.

Referring more specifically to the drawing, the novel oil sampling apparatus in its entirety is designated generally 15 and for the purpose of illustrating one preferred application and use thereof, a portion of a flow line is illustrated in the drawing and designated generally 16, and said flow line portion is shown having a conventional flow meter, designated generally 17, interposed therein. The flow meter 17 is provided with two transverse chambers 18 and 18a, each containing a vane or blades 19 and 19a, respectively, which are driven by the liquid passing through the flow meter chambers 18 and 18a in a clockwise direction, as seen in Figure 1. The vanes 19 and 19a are fixed to a shaft 20 which extends transversely through the flow meter and is driven in a clockwise direction, as seen in Figure 1, by rotation of the vanes. Each of the flow meter chambers has a flap valve 21 to prevent the liquid from passing through the chambers except in a clockwise direction around the shaft 20 from the inlet 22 to the outlet 23 of the chambers and so that clockwise motion will be imparted to the vanes and shaft by the liquid. The flow meter 17 is of conventional construction and the parts thereof which have been illustrated and briefly described are all conventional. Furthermore, it is to be understood that the sampler apparatus 15 will function equally well with any other unit interposed in a flow line which includes a shaft which is revolved by the pressure of the liquid passing through the flow line.

The sampler apparatus 15 includes a housing or enlargement formed on or secured to a portion of the housing of the flow meter 17 and which enlargement 24 has a bore extending from end-to-end thereof as seen at 25. A port 26 is formed in the flow meter housing and has an inner end opening into either the chamber 18 or 18a and an outer end opening into the bore 25. The enlargement 24 is provided with an outlet port 27 disposed in a part thereof located opposite to the port 26 and longitudinally offset relatively to said port 26. The enlargement 24 is also provided with a downwardly opening discharge port 28 located between the ports 26 and 27.

Conduits 29 and 30 have inlet ends connected to the ports 27 and 28, respectively, and which are provided with manually operated shutoff valves 29a and 30a, respectively. Said conduits 29 and 30 have opposite merging ends connected to a conduit 31 which extends into a sampler storage tank 32 and which opens adjacent the bottom of said tank. The sampler storage tank 32 is provided at its bottom with a drain pipe 33, which is normally closed by a manual shutoff valve 34.

The conduit 31 is provided with an automatic shutoff valve, designated generally 35, which is located within the tank 32 and which includes a valve housing 36 in which a valve core 37 is journalled transversely of the portion of the conduit 31 in which the valve 35 is interposed. The core 37 is provided with a transverse bore 38 movable in and out of registry with the conduit 31 and which shuts off the flow through said conduit when disposed out of registration therewith. A float supporting arm 39 is adjustably connected to one end of the core 37 by a collar 40, which is fixed to one end of said arm 39. A float 41 is mounted on the opposite end of the arm 39. A lower stop element 42 and an upper stop element 43 are fixed to and project from the housing 36 and have terminal portions between which the intermediate portion of the arm 39 is swingably disposed. The arm 39 normally rests on the lower stop 42 and when thus disposed, the bore 38 is in registration with the conduit 31 to allow a liquid to flow by gravity through the valve 35 and to discharge by gravity from the lower end of the conduit 31 into the tank 32.

A core or valve body 44 of circular cross section is journalled in the bore 25. The valve body 44 has a threaded stem 45 at one end thereof receiving a nut 46 and washer 47 which washer abuts one of the sides of the flow meter housing 17 or an end of the enlargement 24. A stem 48 of noncircular cross section projects from the opposite end of the valve body 44 and has a collar 49 detachably and adjustably fixed thereto and disposed against the opposite end of the enlargement 24 or the opposite side of the flow meter housing and which cooperates with the nut 46 and washer 47 to retain the valve body 44 against sliding movement in the bore 25. A gear 50 is mounted on the stem 48 outwardly of the collar 49 in fitting engagement with a part of said noncircular stem for keying the gear to the stem. The stem 48 is provided with a threaded terminal of circular cross section as seen at 51 in Figure 5 to receive a nut 52 to retain the gear on the stem. The gear 50 meshes with a small pinion 53 which is journalled on a stub shaft 54 which projects outwardly from one side of the housing of the flow meter 17. A larger gear 55 is fixed to the pinion 53 and journalled on the stub shaft 54. The gear 55 meshes with a small pinion 56 which is fixed to the flow meter shaft 20, so that the gear train as illustrated in Figures 1 and 3 will cause the valve body 44 to be driven at a greatly reduced speed relatively to the shaft 20 by rotation of said shaft 20. The valve body 44 is provided with a diagonal bore 57 extending therethrough and which is disposed between sealing rings 58 which are mounted in annular grooves 59 of the valve body 44.

The top of the sample storage tank 32 is closed and said tank is accordingly provided with a vent tube 60 having a valve seat 61 constituting the lower end thereof and disposed within said tank. The upper end of the vent tube opens above the tank to the atmosphere. A valve stem 63 extends upwardly into the tube 60 reciprocally through a guide 62 and said valve stem 63 is provided with a head 64 at its upper end which functions as a stop to engage the upper side of the guide 62 to limit downward movement of the stem 63. A valve 65 is attached to the stem 63 and is disposed within the tank 32 normally below the valve seat 61. A float 66 is fixed to the lower end of the stem 63 beneath the valve 65. The weight of the stem 63, valve 65 and float 66 normally retains the valve in an open position, as illustrated in Figure 1, so that air can escape upwardly through the vent tube 60 to the atmosphere.

Assuming that a liquid, such as oil, is flowing from right to left through the conduit 16 to cause operation of the flow meter 17 through rotation of its shaft 20 in a clockwise direction, as seen in Figure 1, the valve body 44 will likewise be caused to turn in a clockwise direction in the bore 25 but at a much slower speed. Assuming that the valve 30a is closed, at each revolution of the valve body 44 the right-hand end of the bore 57 will move into and then out of registry with the discharge port 26 and at the same time the left-hand end of said bore 57, as illustrated in Figure 5, will move into and out of registry with the outlet port 27, so that oil may pass from the port 26 through the bore 57 into the outlet port 27, and will then flow through the conduit 29 past the open valve 29a, through conduit 31 and past the open valve 35 and be discharged into the tank 32. However, the passage 57 only registers with the ports 26 and 27 in one position with the valve 44 during each complete revolution thereof since when the valve has completed a half turn from its position of Figure 4, the two ends of the passages 57 will be spaced from the ports 26 and 27, so that only a small amount of oil will be discharged from the port 27 at each complete revolution of the valve 44. The valve 44 is intended for use with relatively light grade high specific gravity oils or other liquids which flow freely, and the size of the passage 57 may be varied to accommodate liquids of different specific gravities so that a desired quantity of such liquid can thus escape from the flow line into the tank 32 during a predetermined period of time, as for example twenty-four hours. Likewise, the size of the passage 57 may be varied depending upon the normal rate of flow through the flow line 16 since a flow line having a large volume of flow and greater pressure would cause the valve 44 to be rotated at a higher speed and would additionally cause more liquid to pass through the passages 57 at each revolution of the valve 44 due to the greater pressure in the flow line.

Should the rate of flow be greater than anticipated or in the event that the sampler 15 is not shut off by closing the valve 29a at the end of the predetermined period, as for example twenty-four hours, as the amount of oil or other liquid rising in the tank 32 to and above the level of the float 41, as seen in Figures 1 and 12, the float will be lifted by the liquid and cause the arm 39 to swing upwardly toward the upper stop 43 to thus move the valve bore 38 out of registration with the conduit 31 to thereby close the valve 35 to prevent further liquid entering the tank 32 or passing through the passage 57. Should the valve 35 fail to close effectively, the liquid in the tank 32 will raise the float 66 and also the valve 65 to cause the valve 65 to engage the valve seat 61 thereby closing the vent tube 60 and prevent additional air from escaping from the tank 32 to thus provide an additional means for stopping the discharge of the liquid from the conduit 31 into the tank 32. The quantity of liquid to be used as a sample is drawn off by gravity from the tank 32 through the drain pipe 33 by opening its valve 34.

Figures 7 and 8 illustrate another valve body 44a for use in lieu of the valve body 44 for heavier or dirtier oils having a lower specific gravity and which flow less readily. The valve body 44a is provided with an elongated opening 57a extending diametrically therethrough and which is elongated longitudinally of said valve body so that each end of the opening 57a will register with both the ports 26 and 27 so that a discharge will occur through the opening or passage 57a at each half revolution of the valve body 44a. The passage 57a replaces the passage 57 and the valve body 44a is otherwise identical with the valve body 44.

Figures 9 and 10 illustrate another modification of the valve body including a valve body 44b for use in lieu of the valve body 44 or 44a and which has a recess in the periphery thereof between the sealing rings defining a trap 57b for use in lieu of the passages 57 or 57a. When employing the core 44b, the valve 29a is closed and the valve 30a is open. At each revolution of the valve 44b, the recess or trap 57b moves into registration with the port 26 and the oil or liquid flows through said port into the trap 57b. As the valve 44b continues to rotate, the trap 57b moves out of registration with the port 26 and thereafter into registration with the outlet port 28. The trapped oil or liquid in the trap 57b flows by gravity from said trap through the port 28 and conduit 30 into the conduit 31, through which it is carried to the tank 32, in the same manner previously described. As the flow from the trap 57b through the outlet 28 is by gravity, the amount of liquid discharged will be less than would otherwise occur where the flow through the outlet port is under pressure and will depend to a considerable degree upon the specific gravity of the oil or liquid and the size of the trap, which may be varied.

Figure 11 illustrates another modification of the invention having a larger housing 24c provided with two communicating bores 67 and 68, in lieu of the single bore 25. The housing 24c is detachably fastened to the housing of the flow meter 17 by fastenings 69, and it is to be understood that the housing 24 may be similarly mounted detachably on the flow meter housing. The port 26c of the flow meter housing communicates with a port 70 of the housing 24c, which in turn opens into the bore 67. In lieu of the valve bodies 44, 44a or 44b, the housing 24c contains two gears 71 and 72 which are rotatably disposed in the bores 67 and 68, respectively, in meshing engagement with one another. The gears 71 and 72 are fixed to shafts 73 and 74, respectively, which are suitably journalled in the housing 24c. One end of one of the shafts, as for example the shaft 73, is fixed to the gear 50 so that said shaft will be driven by the gear train as illustrated in Figure 3 to turn the gear 71 in a clockwise direction as seen in Figure 11. The other gear 72 and its shaft 74 is driven counterclockwise by the meshing engagement of the gears. The housing 24c is provided with an outlet port 75 opening outwardly of the bottom thereof and connected to the conduit 30. The outlet port 75 is provided with an enlarged inner end 76 which communicates with the two bores 67 and 68 adjacent the meshing portions of the gears and below and spaced from the port 70. Assuming that the gear 71 is rotating clockwise and the gear 72 is rotating counterclockwise, as seen in Figure 11, a liquid such as a heavy oil of low specific gravity will flow through the bores 26c and 70 into the pockets between the teeth of the gear 71 and will then be carried downwardly between said gear teeth and expelled therefrom into the chamber 76 as the teeth of the gears 71 and 72 move into meshing engagement. The heavy oil will be forced from the chamber 67 through the outlet port 75 and conduit 30 by pressure built up in the chamber 76 by the oil forced into said chamber by the gears 71 and 72. The oil will flow through the pipe 30 to the storage tank 32 in the same manner as previously described in reference to the valve 44b. The amount of oil or other liquid thus supplied to the storage tank may be varied by varying the size of the teeth of the gears 71 and 72.

For obtaining a sample of an oil or other liquid which flows very freely, a ratchet wheel 77 may be substituted for the gear 50, as illustrated in Figure 13, and a pawl 78 having a single tooth 79 for engagement with the teeth of the ratchet wheel 77 may be substituted for the pinion 53 so that the ratchet wheel will be revolved at a very slow speed relatively to the rate of rotation of the shaft 20 for turning one of the valve bodies, as for example the valve body 44b, or for turning the gears 71 and 72 at a much slower speed than the ratio of the speed of rotation of the valve body and gears relatively to the shaft 20 when the gear train as illustrated in Figures 1 and 4 is utilized.

Various other modifications and changes are contemplated and may obviously be resorted to, without departing from the spirit or scope of the invention as hereinafter defined by the appended claim.

I claim as my invention:

A liquid sampling apparatus comprising a housing, a liquid conduit system having a part to which said housing is connected, a shaft extending through and journaled in said conduit system part, a flow responsive element fixed to said shaft and disposed for rotation in said conduit system part, said flow responsive element being revolved by the velocity of liquid flow through said conduit system part, said housing being provided with a chamber, an inlet conduit forming a communicating passage between said conduit system part and said chamber, said housing having a downwardly opening outlet port communicating with and extending downwardly from said chamber, a valve body mounted in said chamber having a recess formed therein defining a trap opening outwardly of the valve body, reduction gearing connecting said valve body to said shaft whereby the valve body is revolved by rotation of the flow responsive element and at a reduced speed relative to the speed of rotation of said element for moving the trap into registration with the inlet conduit for receiving liquid from said conduit system part and for thereafter moving the trap out of registration with the inlet conduit and into registration with the outlet port for discharging the liquid within the trap from the housing by gravity through said outlet port; a sample storage tank disposed beneath said housing, a conduit having one end connected to the outlet port and having an opposite lower end discharging into a lower portion of said tank, a vent tube having one end opening into an upper portion of the tank and an opposite end opening to the atmosphere above the tank, said tank being sealed except for the vent tube and said conduit connecting the tank and housing, a valve for closing said vent tube and normally disposed in an open position, and a float connected to said valve and responsive to the liquid level in the tank for closing the valve when the liquid in the tank rises to a predetermined level.

References Cited in the file of this patent

UNITED STATES PATENTS

| | | |
|---|---|---|
| 1,083,183 | Bednarowicz | Dec. 30, 1913 |
| 1,691,687 | Watts | Nov. 13, 1928 |
| 1,964,270 | Nidever et al. | June 26, 1934 |
| 1,968,293 | Gould | July 31, 1934 |
| 2,434,723 | Shook | Jan. 20, 1948 |
| 2,539,106 | Schenk | Jan. 23, 1951 |
| 2,576,737 | Wendel | Nov. 27, 1951 |
| 2,588,461 | Atterling et al. | Mar. 11, 1952 |
| 2,656,724 | Cox et al. | Oct. 27, 1953 |